(12) United States Patent
Hoffman

(10) Patent No.: US 8,044,634 B2
(45) Date of Patent: *Oct. 25, 2011

(54) ENHANCED PORTABLE BATTERY POWERED ELECTRICAL APPLIANCE

(75) Inventor: Peter F. Hoffman, Avon, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/705,766

(22) Filed: Feb. 15, 2010

(65) Prior Publication Data

US 2010/0142195 A1    Jun. 10, 2010

Related U.S. Application Data

(63) Continuation of application No. 11/269,440, filed on Nov. 8, 2005, now Pat. No. 7,688,029.

(51) Int. Cl.
  *H02J 7/00* (2006.01)
(52) U.S. Cl. ........... 320/114; 320/110; 320/119; 361/92
(58) Field of Classification Search .................. 320/114; 324/435
See application file for complete search history.

(56) References Cited

U.S. PATENT DOCUMENTS

| | | |
|---|---|---|
| 3,579,075 A | 5/1971 | Floyd |
| 3,735,232 A | 5/1973 | Fister |
| 3,873,846 A | 3/1975 | Morio et al. |
| 4,704,663 A | 11/1987 | Ohashi |
| 4,766,361 A | 8/1988 | Pusateri |
| 4,808,904 A | 2/1989 | Ricaud et al. |
| 4,816,735 A | 3/1989 | Cook et al. |
| 4,876,632 A | 10/1989 | Osterhout et al. |
| 5,057,761 A | 10/1991 | Felegyhazi et al. |
| 5,167,447 A | 12/1992 | Gonzales |
| 5,243,269 A * | 9/1993 | Katayama et al. ............ 320/126 |
| 5,353,208 A | 10/1994 | Moore |
| 5,373,195 A | 12/1994 | De Doncker et al. |
| 5,438,248 A | 8/1995 | Hyuck |
| 5,583,753 A | 12/1996 | Takayama |
| 5,686,811 A | 11/1997 | Bushong et al. |
| 5,721,481 A | 2/1998 | Narita et al. |

(Continued)

FOREIGN PATENT DOCUMENTS

EP    1463190 A    9/2004

(Continued)

OTHER PUBLICATIONS

Patent Cooperation Treaty (PCT), International Search Report and Written Opinion for Application No. PCT/US2006/042613, filed Oct. 31, 2006, mailed Nov. 5, 2007, 12 pages, European Patent Office, Netherlands.

(Continued)

*Primary Examiner* — Arun Williams
(74) *Attorney, Agent, or Firm* — Michael C. Pophal

(57) ABSTRACT

An appliance, such as a flashlight, accepts first and second batteries. The appliance also includes an electrical load, such as a light source. A first circuit, such as a DC to DC converter, receives power from the first battery and supplies power to the load. A second circuit, such as a DC to DC converter, receives power from the second battery and supplies electrical power to the load. In one embodiment, the appliance accepts batteries having multiple physical sizes.

17 Claims, 2 Drawing Sheets

U.S. PATENT DOCUMENTS

| | | | |
|---|---|---|---|
| 5,872,831 | A | 2/1999 | Zoiss et al. |
| 5,903,131 | A | 5/1999 | Sekine et al. |
| 5,912,544 | A | 6/1999 | Miyakawa et al. |
| 5,959,368 | A | 9/1999 | Kubo et al. |
| 6,021,332 | A | 2/2000 | Alberth, Jr. et al. |
| 6,157,308 | A | 12/2000 | Byers |
| 6,225,708 | B1 | 5/2001 | Furukawa et al. |
| 6,316,913 | B1 | 11/2001 | Chalasani et al. |
| 6,337,558 | B1 | 1/2002 | Yuen et al. |
| 6,509,717 | B2 | 1/2003 | Lee |
| 6,605,923 | B1 | 8/2003 | Kellogg |
| 6,610,941 | B2 | 8/2003 | Pfeiffer |
| 6,616,296 | B1 | 9/2003 | Roux et al. |
| 6,741,065 | B1 | 5/2004 | Ishii et al. |
| 6,803,745 | B2 | 10/2004 | Nishida et al. |
| 6,804,461 | B1 | 10/2004 | Hagiuda et al. |
| 6,851,828 | B1 | 2/2005 | Hansen |
| 6,876,172 | B2 | 4/2005 | Lam et al. |
| 6,945,666 | B2 | 9/2005 | Woolfson |
| 7,148,656 | B2 | 12/2006 | Sodeno |
| 7,220,013 | B2 | 5/2007 | Sharrah et al. |
| 7,352,154 | B2 | 4/2008 | Cook |
| 2002/0017895 | A1 | 2/2002 | Kawashima |
| 2002/0063550 | A1 | 5/2002 | Chen et al. |
| 2002/0093818 | A1 | 7/2002 | Mele |
| 2002/0135345 | A1 | 9/2002 | Terashi |
| 2004/0004402 | A1* | 1/2004 | Kippley ............ 307/82 |
| 2004/0041473 | A1 | 3/2004 | Deguchi |
| 2004/0046673 | A1* | 3/2004 | Kovarik et al. ............ 340/636.1 |
| 2004/0095759 | A1 | 5/2004 | Koch et al. |
| 2005/0024865 | A1 | 2/2005 | Hansen |
| 2005/0041352 | A1 | 2/2005 | Seo |
| 2005/0073860 | A1 | 4/2005 | Yang et al. |
| 2005/0122715 | A1 | 6/2005 | Furth et al. |
| 2005/0151508 | A1 | 7/2005 | Cook et al. |
| 2005/0185404 | A1 | 8/2005 | Khalili |
| 2005/0225971 | A1 | 10/2005 | Melnik |
| 2006/0284490 | A1 | 12/2006 | Kumar |

FOREIGN PATENT DOCUMENTS

| | | |
|---|---|---|
| JP | 02018536 A | 1/1990 |
| WO | 03038980 A | 5/2003 |

OTHER PUBLICATIONS

Dallas Semiconductor, Maxim High-Precision Li+ Battery Monitor DS2760, date unknown, pp. 1-26, www.maxim-ic.com.

Unknown, FD-30 Advanced Super Rapid Charger 30-minute Ultra-Fast Charger, date unknown, 2 pages.

Unknown, NEXcell OPTIMA "Smart Fast" (500mA) AA/AAA Battery Charger and Conditioner, date unknown, 3 pages.

TECHTIUM, Step-Up Converter and Charge Controller from Primary Battery to NiCad, NiMH, or Li-Ion Secondary Batteries, date unknown, pp. 1-28, www.techtium.com.

MAXIM Integrated Products, MAX1705 Evaluation Kit, 1997, pp. 1-4, Maxim Integrated Products, Sunnyvale, CA, http://www.maxim-ic.com.

MAXIM Integrated Products, 1- to 3-cell, High-Current, Low-Noise, Step-Up DC-DC Converters with Linear Regulator MAX1705MAX1706, Apr. 1997, pp. 1-20, Rev. 0, http://maxim-ic.com.

Dallas Semiconductors, Two AA Cell Power Step-Down Regulator and 3.3V Boost, Application Note 256, Jan. 7, 1999, pp. 1-3.

Dallas Semiconductors, Wireless-Modem Power for Hand-Held Devices, Application Note 268, Aug. 1, 2000, 5 pages, http://maxim-ic.com/appnotes_frame.cfm/appnote_number/268 (1of 5) [Aug. 15, 2005 4:16:48 PM].

Dallas Semiconductors MAXIM, Using the D52760 or DS2761 Battery Monitor in Multiple-Cell Applications, Application Note 138, May 4, 2001, pp. 1-3.

Dallas Semiconductors MAXIM, Maxim, Dual Power Supply for Wallcube/Battery-Powered System, Jan. 31, 2002, 2 pages.

David C. Baggaley, Application Xtra Designing Smart Batteries into Medical Devices, May 2003, 1 page, Inspired Energy Inc., Alchua, FI. (Copyright (c) 2003 by Nelson Publishing Inc., www.designfax.net.

TECHTIUM, TCM-EXT06R8 External Charger Circuit from Single-Cell Primary Battery to GSM Cellular Phone, Jan. 2005, pp. 1-8, www.Techtium.com.

Isidor Buchmann, BatteryUniversity.com, May 2005, 5 pages, Cadex Electronics Inc., http://batteryuniversity.com/partone-24.htm.

AMTEL Corporation, AV453; Smart Battery Reference Design, Application Note, Aug. 2005, pp. 1-37, rev. 2599A-AVR-08/05, www.amtel.com/literature.

* cited by examiner

ENHANCED PORTABLE BATTERY POWERED ELECTRICAL APPLIANCE

RELATED APPLICATIONS

This application is a continuation of U.S. application Ser. No. 11,269,440, now U.S. Pat. No. 7,688,029, filed Nov. 8, 2005, which is hereby incorporated by reference.

FIELD OF THE INVENTION

The present invention finds application to electrical appliances such as flashlights, electrical and electronic devices, medical devices, measurement devices, and other devices which use more than a single power source.

BACKGROUND

Primary or non-rechargeable batteries are available in a variety of physical sizes, chemistries, and voltages. For example, alkaline and carbon-zinc primary batteries are commonly available in AAA, AA, C, and D size cells which provide a nominal output voltage 1.5 volts direct current (VDC). Secondary or rechargeable batteries are likewise available in a variety of physical sizes, chemistries, and voltages. Examples include lithium ion, nickel metal hydride (NiMH), and nickel cadmium (NiCd) batteries which are available in a range of sizes and voltages. NiMH and NiCd batteries, for example, are commonly available in AAA, AA, C, and D size cells which provide a nominal output voltage of 1.2 VDC. Of course, still other battery sizes, chemistries, and voltages are also available.

Electrical appliances which rely on batteries as a source of electrical energy are ubiquitous. These appliances perform a variety of functions and are used in numerous situations, including for example consumer, commercial, industrial, and medical applications. Consequently, portable electric appliances present a wide variety of electrical loads, such as a light source in the case of a flashlight, sophisticated electronic circuitry and displays in the case of computing and medical devices, electric motors in the case of devices which produce motion, heating and cooling devices, and the like. Moreover, these devices are packaged in any number of sizes and shapes, depending on the characteristics of the particular appliance and its application. Generally, however, it is desirable that these portable devices be readily transportable by a human.

The batteries received by these devices are often connected electrically in series so as to provide the voltage needed to power the load. Where relatively larger currents are required, two or more batteries (or groups of batteries connected in series) are sometimes connected electrically in parallel.

While such configurations have proven to be extremely useful, they can present operational issues. Thus, for example, the mixing of primary and secondary batteries, partially discharged batteries, batteries having differing charge states, or batteries having different chemistries can deleteriously affect the performance of the batteries and the operation of the appliance. It can also be difficult or impossible to hot swap batteries during the operation of the appliance.

Another recurring issue is the availability of batteries to power these appliances. A particularly vexing situation arises when batteries of the size or type required by a particular appliance are not readily at hand. While an appliance which accepts batteries of more than one size or type provides additional flexibility, the mixing of different size batteries can likewise deleteriously affect the performance of the batteries and the operation of the appliance.

SUMMARY

Aspects of the present invention address these matters, and others.

According to a first aspect of the present invention, a portable battery powered appliance selectively receives first and second batteries. The appliance includes a first electrical load, a first power converter which receives power from the first battery and supplies power to the first electrical load, a second power converter which receives power from the second battery and supplies power to the first electrical load.

According to another aspect of the present invention, a portable battery powered appliance includes a housing which selectively receives at least first and second batteries. The appliance also includes a first electrical load carried by the housing, a first circuit carried by the housing and disposed electrically between the first battery and the first electrical load, and a second circuit carried by the housing and disposed electrically between the second battery and the first electrical load. The first circuit permits the first battery to supply power to the first electrical load and prevents the first battery from receiving power supplied by the second battery. The second circuit permits the second battery to supply power to the first electrical load and prevents the second battery from receiving power supplied by the first battery.

According to still another aspect of the present invention, a flashlight includes a housing which selectively receives a first battery having at least two physical sizes and a second battery having at least two physical sizes, a light source, a first DC to DC converter having an input which receives a voltage provided by the first battery and an output which supplies an output voltage to the light source, and a second DC to DC converter having an input which receives a voltage provided by the second battery and an output which supplies an output voltage to the light source. The outputs of the first and second DC to DC converters are connected electrically in parallel.

According to another aspect, an appliance includes a load, a first power isolation circuit, and a second power isolation circuit. The first power isolation circuit generates a first power and isolates the load from the first power on the first power being insufficient to independently power the load. The second power isolation circuit generates a second power and isolates the load from the second power on the second power being insufficient to independently power the load. The load receives at least one of the first power and the second power.

Those skilled in the art will recognize still other aspects of the present invention upon reading the attached description.

DETAILED DESCRIPTION

Figure 1:
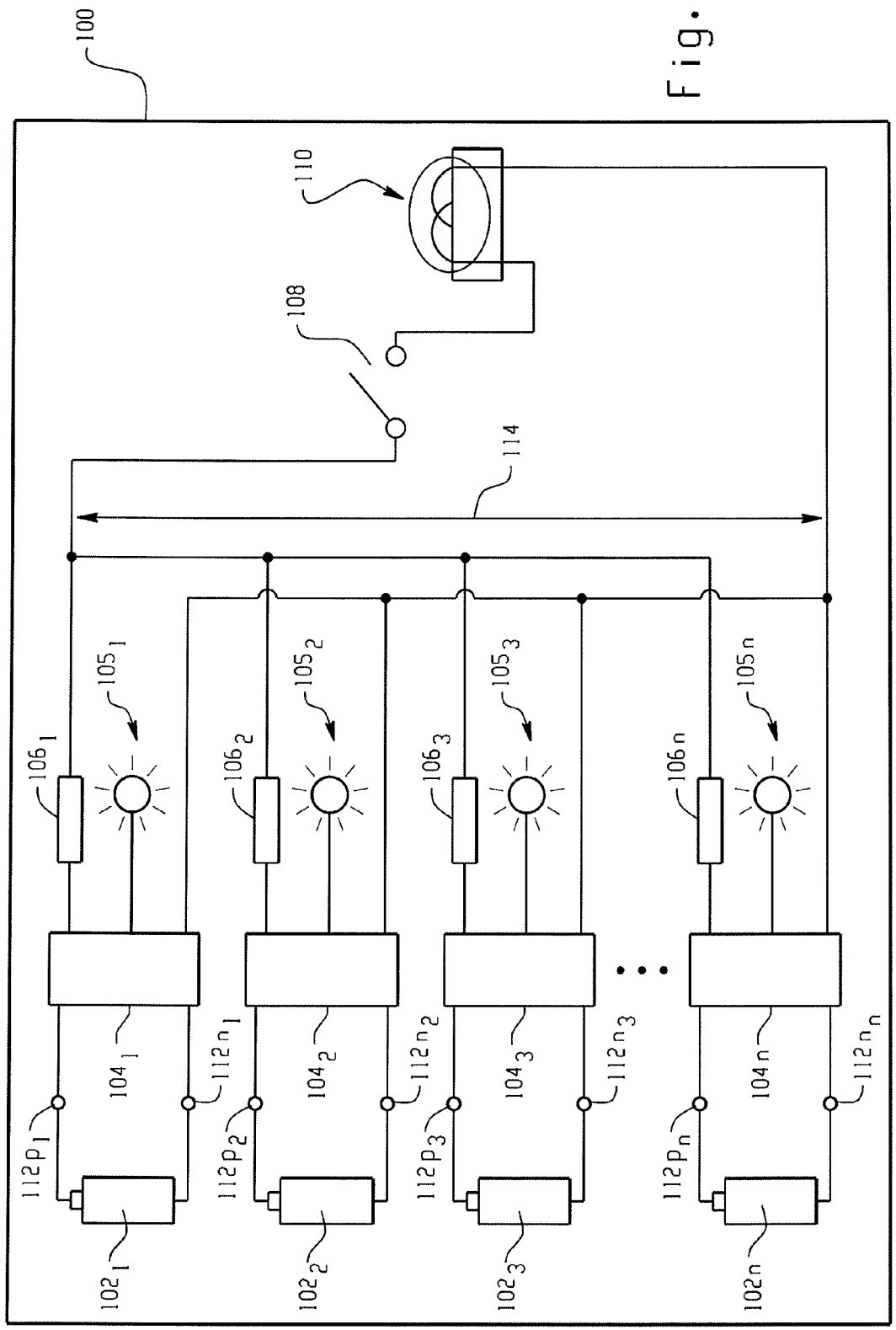
FIG. 1 depicts a portable battery powered appliance.

FIG. 1 depicts a portable battery powered electrical appliance such as a flashlight. The appliance includes a housing 100 which selectively receives two or more batteries $102_1$, $102_2$, $102_3$, ... $102_n$. The housing 100 also carries two or more power management circuits $104_1$, $104_2$, $104_3$, ... $104_n$, isolation circuitry $106_1$, $106_2$, $106_3$, ... $106_n$, a power switch 108, and an electrical load 110 such as a lamp. Also associated with each power management circuit are positive $112p_1$, $112p_2$, $112p_3$, ... $112p_n$, and negative $112n_1$, $112n_2$, $112n_3$, ... $112n_n$ electrical contacts.

Each power management circuit 104 is electrically connected to a corresponding battery 102 and preferably includes a direct current to direct current (DC to DC) converter which converts the input voltage provided by the corresponding battery to a desired output voltage.

Each power management circuit 104 is configured to accept an input voltage or voltage range appropriate to the battery 102 at its input. In one embodiment, the power management circuit 104 accepts input ranging from about 0.9 to 5.5 volts direct current (VDC). Such an arrangement is particularly suitable where the appliance is configured to accept batteries 102 of multiple chemistries or where the batteries 102 may include more than one cell or battery connected in series. Alternately, each power management circuit 104 may be configured to accept a single nominal input voltage or a relatively limited range of nominal input voltages, for example nominal input voltages in the range of approximately 1.2 to 1.5 volts direct current (VDC). Such an arrangement is particularly well suited to situations in which the housing 100 is configured to accept one or more of D, C, AA, or AAA size cells. In either case, the power management circuits 104 are preferably configured to also operate with input voltages somewhat below the nominal input voltage to allow for continued operation as the battery or batteries 102 discharge. Different nominal input voltages and voltage ranges are also contemplated.

The power management circuits 104 are configured to provide an output voltage appropriate for the load 110. Depending on the characteristics of the batteries 102 and the requirements of the load 110, the power management circuits 104 may function as step-up converters, step-down converters, or both. The power management circuits 104 may also produce an output voltage which is approximately the same as the nominal battery voltage. In any case, the power management circuits 104 are preferably configured so that each produces the same nominal output voltage. It is also desirable that the power management circuits 104 include closed loop feedback or otherwise provide at least a degree of voltage regulation at their respective outputs. While optional, such a configuration is particularly useful where it is desirable to present the load 110 with a nominally constant voltage, even as one or more of the corresponding batteries 102 discharge, or where the power management circuits 104 are configured to accept a range of input voltages.

Each power management circuit 104 preferably also includes state-of-charge detection circuitry which detects the charge state of the corresponding battery 102. In one embodiment, the state-of-charge detection circuitry disables the power management circuit 104 if the corresponding battery 102 becomes discharged, is not installed, or if the battery's output voltage otherwise falls below a threshold voltage. One or more human readable indicators $105_1$, $105_2$, $105_3$ ... $105_n$ such a liquid crystal display, light emitting diode, or beeper or other audible device in electrical communication with the state-of-charge detection circuitry may also be provided to indicate the charge state of the batteries 102. In addition to or instead of providing a binary charged/discharged indication, the indicators may also indicate the relative charge state of the batteries 102. The indicator or indicators are preferably carried by the housing 100 in a location where they can be seen, heard, or otherwise perceived by the user. Where the load 110 otherwise includes a human readable display, the indicator functionality may also be performed by the display.

One suitable implementation of the power management circuits 104 is based on the Max1705 DC to DC converter integrated circuit available from Maxim Integrated Products, Inc. of Sunnyvale, Calif. Other implementations are contemplated.

The outputs of the various power management circuits 104 are connected electrically in parallel to create what can be visualized as a common voltage bus or connection 114. Disposed between each power management circuit 104 and the voltage bus 114 is an isolation circuit 106 such as a field effect transistor, diode, or the like. The isolation circuit isolates its corresponding power management circuit 104 in case the power management circuit 104 is disabled or otherwise is not producing the desired output voltage. More particularly, the isolation circuits 106 prevent current supplied by other power management circuits 104 from flowing into any other given power management circuit 104.

The switch 108 controls the application of power to the load 110. In one embodiment, the switch 108 is operated manually by the user. In the case of a flashlight, the load may be implemented as one or more light emitting diodes, incandescent lamps, or other suitable light source(s). Other loads are also contemplated, depending on the function and application of the particular appliance. As will be appreciated, appliances and their loads 110 can have a wide variety of application and take any number of forms. Examples include, by way of example and not limitation, consumer, industrial, commercial, and medical applications. Similarly, the loads 110 may include, by way of example and not limitation, electrical and electronic circuitry, devices which produce heat or cooling, and motors and other devices which generate motion. Depending on the characteristics of the load, it may also be desirable to integrate some or all of the power management circuits 104 with the load 110, for example by integrating some or all of the required functionality in one or more application specific integrated circuits (ASICs).

As noted above, the output voltage of the power management circuits 104 is established based on the voltage required by the load 110. In addition, the number and type of batteries 102 to be accepted by the appliance and the characteristics of the power management circuits 104 are established as a function of the power requirements of the load 110. In a first implementation, the load 110, batteries 102, and power management circuits 104 are selected so that any one of the batteries 102 and power converters 104 are sufficient to independently power the load 110. In a second implementation, at least n+1 batteries 102 and power management circuits 104 are provided, where n is the number of batteries 102 and circuits 104 needed to power the load 100. In a third implementation, n batteries 102 and power management circuits 104 are provided.

As the first implementation provides substantial redundancy and is especially conducive to hot swapping of multiple batteries 102, it is especially well suited to applications where reliability is particularly important. The second implementation facilitates limited hot swapping and provides a degree or redundancy while being relatively more space efficient than the first implementation. The third implementation is especially well suited to applications where space efficiency is particularly important.

In the second and third implementation, the appliance 100 may also include load sharing circuitry to equalize the load carried by the various batteries 102 and power management circuits 104.

Where the characteristics of the load 110 are such that it requires a particular operating current, the power management circuits 104 may be implemented as voltage to current converters. The outputs of the various power management circuits would then be connected electrically in series to provide what can be visualized as a common current bus.

The detailed mechanical configuration of the housing 100 is a function of the characteristics and application of the particular appliance and may be readily implemented by one skilled in the art based on application-specific requirements. In one implementation, the housing 100 includes a number of battery receiving regions or apertures, each of which is configured to receive a battery or batteries of a relatively larger size, for example D-size cells. Should the user wish to use a smaller battery, a battery adapter or shell can used to adapt the smaller battery to fit in the housing. In another implementation, each region is configured to receive a battery or batteries of a particular size, for example AAA, AA, C, or D size cells. In still another implementation which is useful where physical size is particularly important, each region is configured to receive batteries having a range of sizes, for example two or more sizes selected from the group of AAA, AA, C, and D size cells. Each receiving area then includes adjustable electrical contacts and mechanical support arrangements suitable for the desired battery sizes, in which case batteries having the desired size can be inserted by the user as needed. Other sizes and combinations of sizes are also contemplated. In applications in which hot swapping is important, the housing 100 is arranged to facilitate access to the batteries 102.

Figure 2:
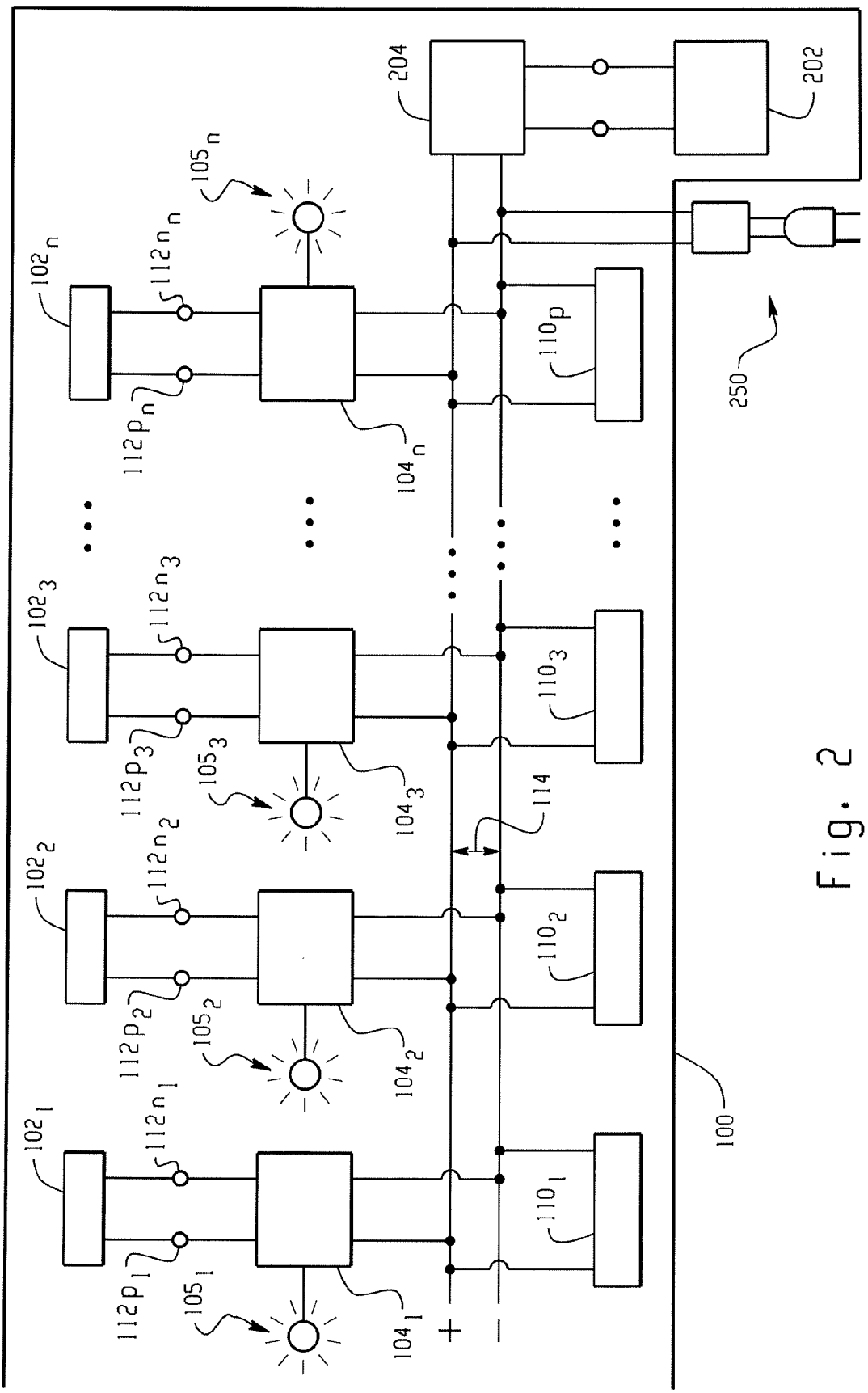
FIG. 2 depicts a portable battery powered appliance.

FIG. 2 depicts a further arrangement for a portable battery powered electrical appliance. The appliance includes a housing 100 which receives two or more batteries $102_1$, $102_2$, $102_3$, ... $102_n$. The appliance also includes corresponding power management circuits $104_1$, $104_2$, $104_3$, ... $104_n$ and one or more electrical loads $110_1$, $110_2$, $110_3$ ... $110_p$, a secondary battery 202, and charge control circuitry 204.

The power management circuits 104 each accept power from one or more batteries 102 through associated contacts 112$p$, 112$n$. While FIG. 2 depicts each battery 102 as comprising only a single battery, multiple batteries may also be connected electrically in series or parallel. The outputs of the power management circuits 104 are connected electrically in parallel with the voltage bus 114.

Each power management circuit 104 isolates its respective battery 102 from the voltage bus. More particularly, each power management circuit 104 permits its corresponding battery 102 to supply power to the load 110 but prevents an inflow of current from other batteries 102 if its corresponding battery becomes shorted, relatively more discharged, or the like. Depending on the characteristics of the batteries 102 and the load, 110, the power management circuits 104 may also provide DC to DC conversion, voltage to current, or other power conversion functionality as described above in FIG. 1. State of charge detection circuitry and a human readable state of charge indicator 105 are also preferably associated with each power management circuit 104.

The electrical loads $110_1$, $110_2$, $110_3$ ... $110_n$ are electrically connected to and receive power from the voltage bus 114. In the case of a flashlight, for example, each load 110 may include one or more light sources such as LEDs. Again, other loads are also contemplated, depending on the function and application of the particular appliance.

In one embodiment, the appliance includes electrical connectors and mechanical mounting arrangements which allow one or more of the loads 110 to be selectively installed or removed from the appliance. Such an arrangement is particularly advantageous in applications where hot swapping or replacement of the loads 110 is required, where it is desirable to readily configure the appliance with different loads 110, or it is otherwise desirable to readily change one or more of the loads 110.

In addition, and depending on the requirements of a particular application, a power switch may be associated with each load 110. Alternately, some or all of the loads 110 may share a common power switch, or some or all of the loads may be unswitched.

The appliance may also accept one or more secondary batteries 202. Bidirectional charge control circuitry 204 connected to the voltage bus 214 controls the charging and discharging of the secondary battery 202. More particularly, the charge control circuitry 204 supplies the requisite energy to charge the secondary battery when sufficient voltage is present on the voltage bus 114. When sufficient voltage is not present on the bus 114 (for example when one or more of the batteries 102 is missing or discharged), the secondary battery 202 powers the voltage bus 114.

The appliance may also include electrical connections for receiving power from an external source 250 such as a low voltage power supply or power cube connected to the alternating current (ac) power mains. Some or all of the power supply functionality may also be included in the appliance 200. Such arrangements facilitate charging of the secondary battery 202 and also extend the life of the batteries 102 in situations where the appliance is operated from a fixed location.

Moreover, the one of the loads 110 may be a power converter 104 of a second battery powered appliance, one example being the flashlight of FIG. 1. In that case, both appliances would include suitable electrical connections for removably connecting the voltage bus 114 of the first appliance with the input of one or more of the power converters 104 of the second appliance. Such a configuration provides additional flexibility in cases where the user does not have a battery for use with the second appliance or wishes to power the second appliance from the first, for example when the first appliance is powered from an external source.

Again, the mechanical configuration of the housing 100, as well as the number and type of batteries 102, power management circuits 104, and the number and characteristics of the loads 110 are readily established based on the requirements of a particular application.

In operation, the user installs the desired batteries 102. Each power management circuit 104 draws power from is respective battery 102 (or batteries) and presents power to the load. Where the power management circuits 104 comprise DC to DC converters, each power management circuit 104 provides the desired DC voltage at its output and hence provides power to the load. As each battery 102 discharges, or if the power drawn by the load 110 changes, the respective power management circuit 104 preferably maintains its output at a substantially constant voltage.

When a particular battery 102 becomes discharged, the respective isolation circuit 106 isolates the particular power management circuit 104 and the battery 102 from the other power management circuit(s). The respective state of charge indicator 105 alerts the user of the need to replace the battery 102. Provided that the remaining battery (or batteries) 102 and power management circuit(s) are sufficient to power the load 110, operation of the load 110 continues unaffected.

The user then replaces the discharged battery 102 with another battery of a type which is accepted by the appliance. Where reliable operation of the load is particularly important, the user may also elect to replace one or more of the batteries before they become fully discharged. For example, if the appliance receives batteries of more than one size, the user may replace the battery 102 with a size that it is readily available, even if it is of a different size than those already installed or the one it is replacing. Even where the appliance accepts batteries having a single size, the user may replace the discharged battery 102 with another battery of the same size, even though its charge state may be uncertain or the batteries are of different chemistry.

Where the appliance includes a secondary battery 202 and charge control circuit 204, the secondary battery 202 is charged from voltage available on the bus 114. Where one or more of the batteries 102 become discharged, are not installed, or are otherwise insufficient to power the load 110 such as in the case of relatively higher peak loads, the secondary power 202 likewise supplies power the bus 114 and hence the load 100.

Also, where the appliance contains suitable connectors and mechanical arrangements, the user may install, remove, or replace one or more of the loads 110 during operation of the other appliance.

The invention has been described with reference to the preferred embodiments. Of course, modifications and alterations will occur to others upon reading and understanding the preceding description. It is intended that the invention be construed as including all such modifications and alterations insofar as they come within the scope of the appended claims.

What is claimed is:

1. An appliance comprising:
   a load;
   a first battery to generate a first received power;
   a first power converter which generates a first power from the first received power;
   a first power isolation circuit that isolates the load from the first power converter on the first power being insufficient to independently power the load;
   a second battery to generate a second received power;
   a second power converter which generates a second power from the second received power;
   a second power isolation circuit that isolates the load from the second power converter on the second power being insufficient to independently power the load; and
   wherein the load receives at least one of the first power and the second power.

2. The appliance of claim 1, wherein the first power isolation circuit comprises isolation circuitry to selectively isolate the first power from the load.

3. The appliance of claim 1, wherein the second power converter yields the second power at a voltage varied from the second battery.

4. The appliance of claim 1, further comprising a state of charge circuit coupled to the load and the first power isolation circuit that determines a state of charge.

5. The appliance of claim 4, further comprising an indicator to indicate the state of charge.

6. The appliance of claim 1, wherein the second power isolation circuit prevents the first power from flowing into the second power isolation circuit.

7. The appliance of claim 1, further comprising load sharing circuitry that equalizes the first power and the second power.

8. The appliance of claim 1, further comprising a secondary battery and charge control circuitry coupled to the secondary battery and the load.

9. The appliance of claim 8, wherein the charge control circuitry charges the secondary battery utilizing at least one of the first power and the second power.

10. The appliance of claim 8, wherein the charge control circuitry provides third power from the secondary battery to the load.

11. A flashlight comprising:
    a housing;
    a light source within the housing;
    a first power converter within the housing and which receives power from a first battery and provides a first power;
    a first isolation circuit within the housing and coupled to the light source and the first power converter wherein the first isolation circuit isolates the first power converter from the light source on the first power being insufficient to independently power the light source;
    a second power converter within the housing and which receives power from a second battery and provides a second power;
    a second isolation circuit within the housing and coupled to the light source and the second power converter wherein the second isolation circuit isolates the second power converter from the light source on the second power being insufficient to independently power the light source; and
    wherein the light source receives at least one of the first power and the second power.

12. The flashlight of claim 11, further comprising a secondary battery and charge control circuitry coupled to the secondary battery and the light source.

13. The flashlight of claim 12, wherein the charge control circuitry charges the secondary battery utilizing at least one of the first power and the second power.

14. The flashlight of claim 12, wherein the charge control circuitry provides third power from the secondary battery to the load.

15. The flashlight of claim 12, further comprising an external source coupled to the load that provides an external power.

16. The flashlight of claim 15, further comprising a load equalizer coupled to the first power converter, the second power converter, and the external source.

17. The flashlight of claim 11, wherein the light source comprises at least one light emitting diode.

\* \* \* \* \*